US009555788B2

(12) United States Patent
Brok et al.

(10) Patent No.: US 9,555,788 B2
(45) Date of Patent: Jan. 31, 2017

(54) MOTOR VEHICLE

(71) Applicant: AUDI AG, Ingolstadt (DE)

(72) Inventors: Tobias Brok, Kösching (DE); Martin Stemmer, Niederding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/521,736

(22) Filed: Oct. 23, 2014

(65) Prior Publication Data
US 2015/0115698 A1 Apr. 30, 2015

(30) Foreign Application Priority Data

Oct. 24, 2013 (DE) .................. 10 2013 017 688

(51) Int. Cl.
B60T 11/10 (2006.01)
B60T 13/68 (2006.01)
(Continued)

(52) U.S. Cl.
CPC .............. B60T 13/686 (2013.01); B60T 8/348 (2013.01); B60T 13/146 (2013.01); B60T 13/18 (2013.01);
(Continued)

(58) Field of Classification Search
CPC ............ B60T 2270/40; B60T 2270/402; B60T 2270/403; B60T 13/662; B60T 7/042; B60T 38/686; B60T 17/226; B60T 17/227; B60T 11/24; B60T 8/88; B60T 8/92; B60T 8/94; B60T 8/1881; B60T 8/3635; B60T 8/364; F16D 2123/00
See application file for complete search history.

(56) References Cited

U.S. PATENT DOCUMENTS 3,477,549 A * 11/1969 Barton .................... B60T 11/24
188/106 P
3,500,725 A * 3/1970 Haddock, Jr. ........... B60T 11/24
188/152
(Continued)

FOREIGN PATENT DOCUMENTS

CN 101909953 A 12/2010
CN 102700539 A 10/2012
(Continued)

OTHER PUBLICATIONS

Search Report issued by the Chinese Patent Office on Oct. 26, 2016 in Chinese Patent Application No. 2014105752029.
(Continued)

Primary Examiner — Robert A Siconolfi
Assistant Examiner — Stephen Bowes
(74) Attorney, Agent, or Firm — Henry M. Feiereisen LLC

(57) ABSTRACT

A motor vehicle includes a first and a second set of two separate hydraulic braking circuits. Each of the two braking circuits of each of the first and second set includes a valve assembly for modulating a braking pressure in the two separate hydraulic braking circuits. A valve unit is arranged downstream of a brake booster and is switchable in response to a malfunction of one or both of the two braking circuits of the first set from a first position in which it connects the valve assembly of the two separate hydraulic braking circuits of the first set to the brake booster, into a second position in which it connects the valve assembly of the two separate hydraulic braking circuits of the second set to the brake booster.

6 Claims, 5 Drawing Sheets

(51) Int. Cl.
*B60T 13/18* (2006.01)
*B60T 13/14* (2006.01)
*B60T 13/66* (2006.01)
*B60T 8/34* (2006.01)
*B60T 13/74* (2006.01)
*B60T 15/02* (2006.01)

(52) U.S. Cl.
CPC ............ *B60T 13/662* (2013.01); *B60T 13/745* (2013.01); *B60T 15/028* (2013.01); *B60T 2270/413* (2013.01)

(56) References Cited

U.S. PATENT DOCUMENTS

| | | | | |
|---|---|---|---|---|
| 3,674,317 | A * | 7/1972 | Mangold | B60T 8/94 303/118.1 |
| 3,733,817 | A * | 5/1973 | MacDuff | B60T 13/162 180/406 |
| 3,818,804 | A * | 6/1974 | Miller | B60T 8/26 188/106 F |
| 5,634,700 | A | 6/1997 | Decker et al. | |
| 5,655,819 | A | 8/1997 | Emig et al. | |
| 6,390,565 | B2 * | 5/2002 | Riddiford | 303/113.4 |
| 6,449,551 | B1 * | 9/2002 | Wrede | B60T 8/00 303/20 |
| 6,709,069 | B2 * | 3/2004 | Riddiford | B60T 13/662 188/1.11 R |
| 2001/0045771 | A1 | 11/2001 | Corrio | |
| 2004/0104617 | A1 | 6/2004 | Noda et al. | |
| 2007/0170774 | A1 | 7/2007 | Gerum | |
| 2009/0315391 | A1 * | 12/2009 | Tanaka | B60T 8/3655 303/113.5 |
| 2011/0108375 | A1 | 5/2011 | Wuerth | |
| 2011/0233011 | A1 | 9/2011 | Brueggemann et al. | |

FOREIGN PATENT DOCUMENTS

| | | |
|---|---|---|
| DE | 195 08 559 | 9/1996 |
| DE | WO/98/49038 | 11/1998 |
| DE | 10036286 | 2/2002 |
| DE | 10320608 | 12/2004 |
| DE | 102006046935 | 10/2008 |
| DE | 102008002345 | 12/2009 |
| DE | 102009030816 | 11/2010 |
| DE | 10 2010 003 237 | 9/2011 |
| DE | 102011108297 | 8/2012 |
| EP | 0 736 431 | 10/1996 |
| EP | 1 396 403 | 3/2004 |
| WO | WO 01/25068 | 4/2001 |

OTHER PUBLICATIONS

English translation of Search Report issued by the Chinese Patent Office on Oct. 26, 2016 in Chinese Patent Application No. 2014105752029.

* cited by examiner

MOTOR VEHICLE

CROSS-REFERENCES TO RELATED APPLICATIONS

This application claims the priority of German Patent Application, Serial No. 10 2013 017 688.3, filed Oct. 24, 2013, pursuant to 35 U.S.C. 119(a)-(d), the disclosure of which is incorporated herein by reference.

BACKGROUND OF THE INVENTION

The following discussion of related art is provided to assist the reader in understanding the advantages of the invention, and is not to be construed as an admission that this related art is prior art to this invention.

For a long time motor vehicles have been provided with two separate hydraulic braking circuits via which the individual wheel brakes, usually disc brakes, can be separately actuated. When the first braking circuit fails the second braking circuit can provide a brake function with reduced deceleration (fail safe).

Modern motor vehicles also have a valve assembly integrated in the first and second braking circuit with an assigned control device. This valve assembly serves for modulating the brake pressure, in order to individually hydraulically control the individual brakes, i.e., to individually vary the respective braking pressure applied to a brake. In this way it is possible to provide a number of assistance functions, which generally render the drive safer or support the driver in certain driving situations. As a result, the brakes and with this also the wheels can be separately controlled or decelerated, for example in order to realize a slip control, to form an anti-locking system, or to generate a steering effect for example by actuating the brakes stronger on one side than on the other sides by correspondingly modulating the braking pressure to thereby generate a certain yaw moment and to a certain degree transversely guide the vehicle. Such a system, i.e., valve assembly with assigned control device, is usually referred to as ESC (electronic stability control) and describes the driving dynamics control or an electronically controlled driver assist system.

The variation of the braking pressure in the first and second braking circuits via the valve assembly with its control unit is accomplished by controlling the flow of hydraulics fluid to the individual brakes via a motor with assigned pump provided on the side of the valve assembly, and by correspondingly controlling the electromagnetic valves via the control device, thereby correspondingly varying the hydraulic pressure. In this way it is possible to very rapidly generate pressure variations and with this cause reactions in the individual brakes or wheels.

When a malfunction occurs in the first braking circuit, for example because a brake tube bursts, at least one corresponding brake function is available in the second braking circuit. Because the driver is fully involved in the guiding of the vehicle he can continue to safely guide the vehicle by only using the second braking circuit and thus safely decelerate and stop the vehicle. This fallback function is usually also referred to as fail-safe.

Modern motor vehicles already enable a partially autonomous driving, i.e., a driving in which the driver is at least to some degree no longer involved in the guiding of the vehicle. There is an increasing trend toward relieving the driver as much as possible and toward a piloted or mostly autonomous driving. This means that the vehicle or the corresponding control is autonomously capable to longitudinally or transversely guide the vehicle without the driver being involved, allowing the driver to turn his attention to other things. However, the increasing degree of piloted driving also increases the demands on the safety-relevant vehicle systems which then, instead of being configured "fail safe", have to be configured "fail operational" because they have to be capable to autonomously guide the vehicle at least for a certain transitional period, i.e., until the driver is actively involved again in the driving operation, even when a malfunction is present. This means that the "fail operational" control has to be configured as if the driver was still fully actively involved. However, braking system designs known to date do not provide such a fail operational behavior.

It would therefore be desirable and advantageous to provide an improved braking system of simple construction which is "fail operational".

SUMMARY OF THE INVENTION

According to one aspect of the present invention, a motor vehicle, includes multiple wheels, each having at least one assigned hydraulically actuatable brake; two separate hydraulic braking circuits for actuating the brakes, each of said two braking circuits comprising multiple valves for modulating a braking pressure in the two separate hydraulic braking circuits, the multiple valves of each of the two hydraulic braking circuits together forming a valve assembly; a control device operably connected with and separately controlling the multiple valves of each of the two hydraulic braking circuits; two further said separate hydraulic braking circuits and a further said control device; a brake booster, operably connectable to the two separate hydraulic braking circuits and the two further separate hydraulic braking circuits; and a valve unit arranged downstream of the brake booster, and in response to a malfunction of the first and/or the second braking circuits being switchable from a first position in which it connects the valve assembly of the two separate hydraulic braking circuits to the brake booster, into a second position in which it connects the valve assembly of the further two separate hydraulic braking circuits to the brake booster.

The respectively four wheel brake connections of the first and second valve block are joined again to form four wheel brake connections downstream of the first and second valve assembly (functionally/hydraulically).

According to the invention, four braking circuits are provided, wherein in the third and fourth braking circuit an identical valve assembly with assigned control device is integrated, i.e., a further ESC (electronic stability control) as it is also provided in the first and second braking circuit. The ESC is completely separated from the first valve assembly and the control device, hydraulically as well as electrically. This means that in terms of configuration and function the third and fourth braking circuits are configured identical to the first braking. When now any malfunction is detected which leads to impairment of the function of the first and/or second braking circuit, for example failure of a pressure generator, failure of a control device, failure of one or more valves or a general electricity failure in the vehicle electric system or electric circuit in which in particular the valve assembly with control device is integrated, the valve assembly of the third and fourth braking circuit with its control device can be directly activated via the corresponding electrically controllable valve unit. This means that the third and fourth braking circuits are activated not only hydraulically but also electrically and control technically. The valve assembly and control device of the third and fourth braking circuits is directly active upon the switching, in particular the control device is already generally in a stand-by mode at the beginning of a drive so that upon switching on the third and fourth braking circuit the control device does not first have to boot.

The switching thus makes all functions of the third and fourth braking circuit available, which do essentially not differ from those of the first and second braking circuit. The integrated valve assembly with its control device enables the same piloted or partially autonomous driving so that the vehicle can be guided in the same manner as prior to the switching. Thus the full brake performance and a limited steering performance are available. The vehicle can thus autonomously bridge in particular the time from detecting a malfunction to the subsequent taking over by the driver, which in this case is of course desired; all braking and steering functions, which were available via the brake system up to this time point are available. The driver receives a take over demand when a malfunction is detected. Independent of the fact how fast the driver follows the take over demand or whether he does not follow it, the valve assembly with assigned control device in the third and fourth braking circuit can safely guide the vehicle and—when the driver does not follow the take over demand—decelerate and stop the vehicle within a short time.

Due to the hydraulic and electrical decoupling, the malfunction detected in the first and second braking circuit does not lead to an impairment of the function of the second braking circuit, in particular of the control device. The control device operates completely independent of the first valve assembly with its control device, spreading of the malfunction is therefore excluded.

One of the central elements in the entire braking system is the valve unit which is intended to very rapidly cause the switching from the first and second to the third and fourth braking circuits or from the first valve assembly to the second vale assembly. For this purpose the valve unit is preferably configured as electrically controllable multi-way valve, in particular a 6/2 way valve. Via this electrically controllable multi-way valve, in particular the 6/2 way valve, it is correspondingly possible to switch the lines coming from the brake booster to the corresponding lines which lead to the two valve assemblies, depending on the switching position of the valve unit. Because usually two lines originate from the brake booster and two lines lead to each valve assembly, a 6/2 way valve is thus sufficient. This is because the 6/2 way valve provides six connections so that two connections are given for the lines coming form the brake booster and respectively two connections for the lines leading to the valve assemblies, with two possible switching positions of the valve. The fact that the valve unit is electrically controllable enables an extremely fast switching.

The valve unit is expediently integrated in a first electric circuit which supplies the valve assembly and associated control device arranged in the first and second braking circuit with current, so that an electromagnetic actuating element, which is provided in the valve unit and is supplied with current via this electric circuit, moves a valve slide into a first position which opens the valve unit to the first valve assembly against the restoring force of a spring element, while in the case of power failure in the first electric circuit the spring element automatically moves the valve slide into a second position which opens the valve unit to the second valve assembly. Thus when the first braking circuit functions properly, in particular when no malfunction occurs in the electric circuit, the valve unit or the valve slide is according to this embodiment of the invention in a position in which the first braking circuit is supplied with current. The electromagnetic actuating element is correspondingly supplied with current via the functioning electric circuit so that the valve slide is held in the first position against the restoring force of a spring element. The actuating element is for example a correspondingly configured electromagnet via which the valve slide is pulled or pushed against the restoring force of the spring element. In case of power failure, the electromagnetic actuating element is necessarily no longer supplied with current, the electromagnet is deactivated. The spring element now necessarily and directly pushes or pulls the valve slide into the second position in which the first and second braking circuits are decoupled and the braking circuit with its valve assembly is activated. This does not require separately supplying the actuating element with current, this means that no switching to a second electric circuit is required for switching the braking circuit. With this a forced switching in the event of a power failure is realized.

For the case that a malfunction of a different type is detected, for example a non functional valve in the first valve assembly or the like, an actuating element or the electromagnetic actuating element provided in the valve unit, which is supplied via the first electric circuit, is controllable via the control device of the first valve assembly for moving a or the valve slide from a first position, which opens the valve unit to the first valve assembly, into a second position which opens the valve unit to the second valve assembly. In this case the switching is thus caused by a corresponding control signal of the first control device, wherein this switching signal simply results in switching the electromagnet currentless, i.e., deactivates the electromagnet so that the already described spring element can move the valve slide, if such a switching valve is provided.

Modern vehicles further may have a so-called electronic parking brake. At least two brakes are provided with additional electric motors which actuate the brakes by moving the brake elements against the brake disc when the vehicle is turned off and the electronic parking brake is selected. This requires a corresponding control of the electric motors. In order to also offer this function, which secures the vehicle in the parked state, also in case of malfunction, i.e., when switching to the third and the fourth braking circuit has occurred, an expedient refinement of the invention provides that the electric motors are controllable via the respectively operated control device of the respective valve assembly which is activated via the valve unit. The activation of the electric parking brake is thus given at any point in time because this either occurs via the first or the second valve assembly or its control devices.

It is also useful in this context when the electric motors are supplied with current via the respective valve assembly or the respective control device. This configuration thus represents redundancy not only regarding the control of the electric motors but also regarding their general supply with current. A power failure in the first electric circuit, usually the main vehicle electric system via which usually also these electric motors are supplied with current, does therefore not have an adverse effect on the functionality of the parking brake, because when switching to the second electric circuit the current supply is taken over via the second electric circuit or the second valve assembly or its control device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
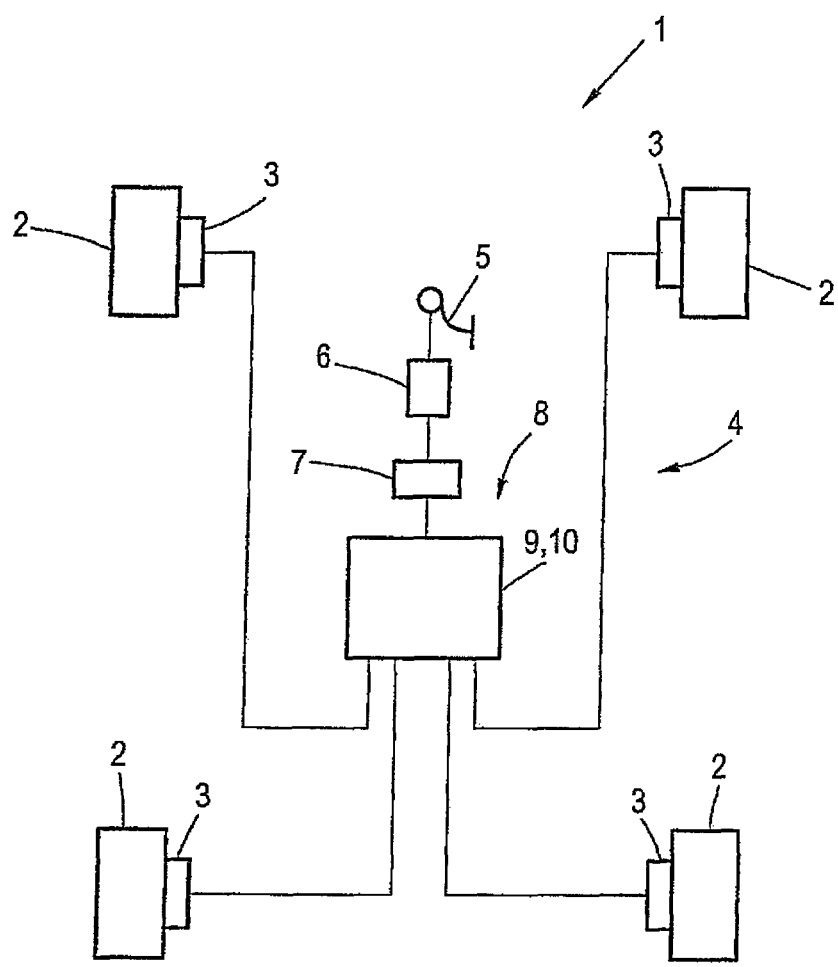
FIG. 1 shows a schematic diagram of a motor vehicle according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 according to the invention including four wheels 2, each being assigned a respective brake 3. The brakes are part of a braking system 4, including a brake pedal 5, a brake booster 6 arranged downstream of the brake pedal and a valve unit 7 arranged downstream of the brake booster, which valve unit 7 is configured to control two separate braking circuits, which are here not further shown, depending on the valve position.

Arranged downstream of the valve unit 7 is a valve block 8, including two separate ESC blocks 9, 10, wherein the ESC block 9 is assigned to the first and second braking circuit and the ESC block 10 is assigned to the third and fourth braking circuit. Each ESC block consists of a here not further shown valve assembly and an associated control device, which will be further discussed below. Via the respective ESC blocks 9, 10 a modulation of the brake pressure is possible in all wheel braking circuits in order to distribute the braking pressure individually to the respective brakes 3. The ESC blocks 9, 10 are connected with the individual brakes 3 via corresponding lines. Through variation of the braking pressure on the individual brakes 3 in the respective braking circuit, the individual brakes can be individually controlled so that corresponding functions, which assist the driver such as a anti-locking system, an anti-slip control but also a steering function can be provided or realized by an individual braking intervention.

Figure 2:
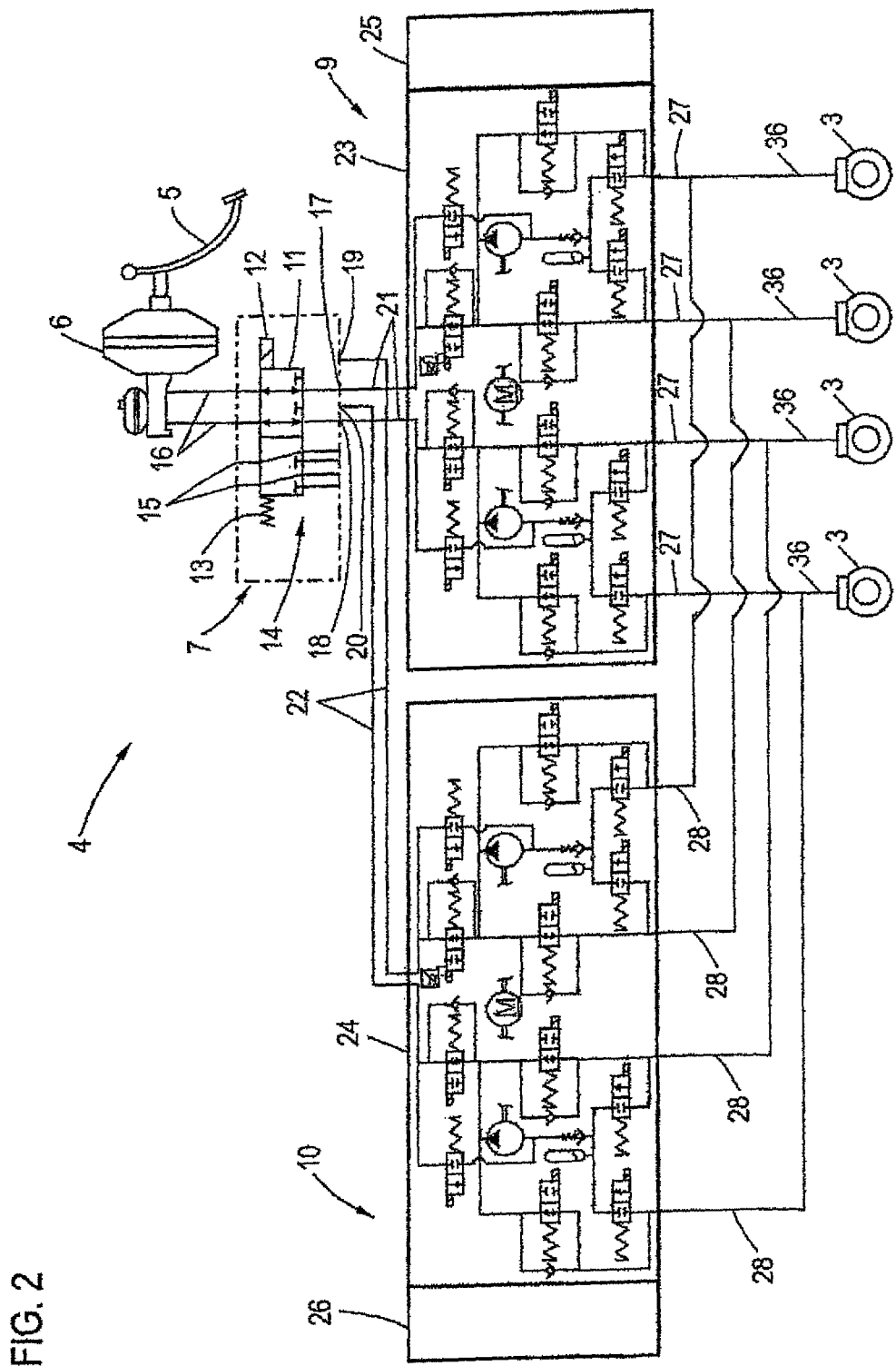
FIG. 2 shows a schematic diagram of the design of the brake system in normal operation.

FIG. 2 shows a schematic diagram of the braking system 4. Shown is the brake pedal 5, the brake booster 6 and the valve unit 7. The valve unit 7 includes for example a valve slide 11, which by way of an electromagnetic actuating element 12 can be caused to assume two defined positions. The valve slide 11 is movable against the restoring force of a spring element 13 in the first position shown in FIG. 2.

The valve unit 7 is an electrically controllable 6/2 way valve 14, which has two inputs 15 to which the two lines 16 coming from the brake booster 6 are connected, and four outputs 17, 18 and 19, 20 to which the lines 21 which lead to the first ESC block 9 or the lines 22 which lead to the second ESC block 10 are connected.

Further shown are the two ESC blocks 9, 10 which each have an identical valve assembly 23 or 24 and an associated identical control device 25 or 26. Each valve assembly 23 includes multiple separate electrically switchable and separately controllable vales, which are correspondingly operatively interconnected in order to distribute or modulate the braking pressure, which is defined and provided via the valve unit 7, the brake booster 6 and the brake pedal 5. For this a corresponding motor and corresponding pumps are integrated in each valve assembly in order to perform corresponding pressure variations. FIG. 2 exemplary shows a corresponding connection arrangement within the respective valve assemblies 23, 24.

From each valve assembly 23, 24 a corresponding line 27, 28 leads to the respective brake 3, wherein the lines 27, 28 are united at corresponding wheel connections and lead in a common line 36 to the brake 3. Via the respective valve assemblies 23, 24 it is possible to control or impinge each brake 3 individually with pressure, i.e., to individually vary the braking force.

FIG. 2 shows the four separate braking circuits, namely the first and second braking circuit, with connections 17 and 18 and the lines 21 connected thereto, the ESC block 9 and the lines 27. The third and fourth braking circuits include the connections 19 and 20 with the lines 22 connected thereto, the ESC block 10 and the lines 28. The lines 10 are thus divided into the four braking circuits, wherein depending on the valve position the first and the second braking circuits (connections 17 and 18) or the third and the fourth braking circuits (connections 19 and 20) are served.

In the position of the valve slide 11 shown in FIG. 2 only the first and second braking circuits are activated, the third and fourth braking circuits are not activated and are not included. As can be seen the lines 16 are connected with the lines 21 via the valve unit 7 on the outlets 17, 18. The valve unit 7 is integrated in the first electric circuit or the main vehicle electric system so that during normal operation when the first braking circuit is connected as shown in FIG. 2, it is always supplied with current from the main electric circuit. This means that the electronic actuating element 12 is supplied with current, its electromagnet pushes the valve slide 11 against the spring element 13 into the first position shown in FIG. 2, in which the first and the second braking circuits are activated.

Detection of a malfunction of any type in the first and/or second braking circuit, results in automatic switching to the third and fourth braking circuit. Such a malfunction can for example result from the fact that one or more valves do not function in the valve assembly 23 or cannot be controlled, that the control device 25 malfunctions or that generally the current supply via the main vehicle electric system is not available. Depending on the malfunction at hand the switching of the valve unit 7 can on one hand be initiated via the control device 25, i.e., the valve unit 7 is controlled via the control device 25, or the current supply to the actuating element 12 is interrupted so that the spring element 13 automatically pushes the valve slide 11 back. On the other hand in case of a general failure of the current supply, the actuating element 12 is no longer supplied with current anyway so that the spring element 13 automatically pushes the valve slide 11 into the second position.

Figure 3:
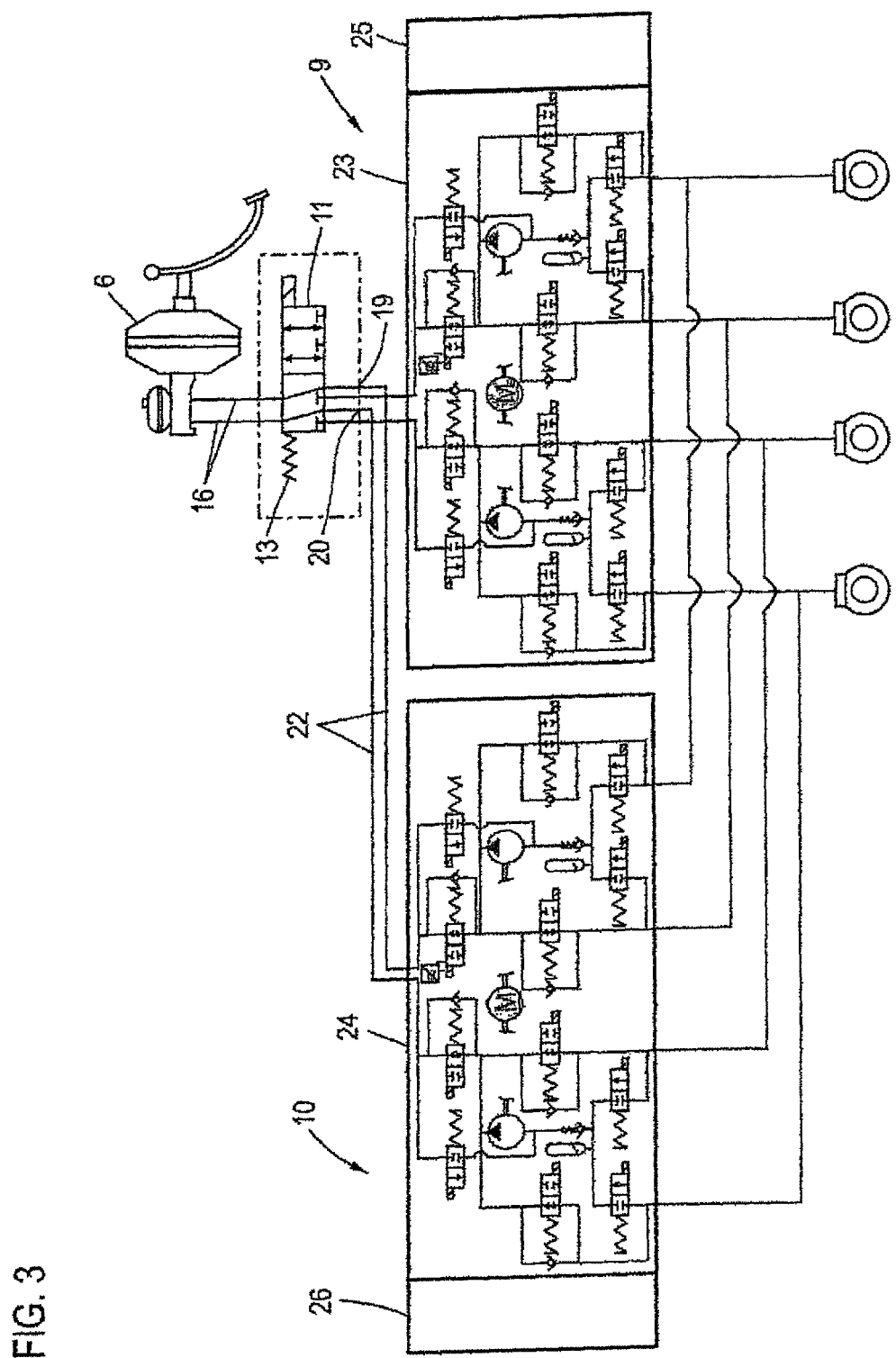
FIG. 3 shows a schematic diagram of the design of the braking system according to FIG. 2 in the emergency operation.

The second position is exemplary shown in FIG. 3. It can be seen that the valve slide 11 is in a second rightwards-shifted position, the third and fourth braking circuits are activated. The spring element 13 has pushed the valve slide 11 into this position, be it as a result of a control via the control device 25, or as a result of the absence of current supply. It can be seen that the lines 16 are now connected with the two outlets 19, 20 via the valve slide 11, which outlets lead to the lines 22, so that the second valve assembly 24 is activated while the first valve assembly 23 is no longer included. Thus in spite of the switching, the identical functionality regarding the brake and steering performance can be realized as it was provided via the ESC block 9, which was included during normal operation, because the two ESC blocks 9, 10 are constructed identical. Thus in spite of a malfunction in the first and/or second braking circuits, the vehicle can continued to be automatically operated with the identical brake and steering performance, i.e., in a piloted manner. In case of switching, the driver of course receives a corresponding signal to take over the control of the vehicle again, and is thus again fully involved, generally the usual functions of the brake system are available to the driver. However, when the driver for whatever reason does not take over or takes over with a delay, the brake system is still capable to automatically guide the vehicle via the control device 26 and the valve assembly 24, with the goal to safely stop the vehicle as soon as possible. The vehicle still possesses this function because the brake system design according to the invention enables a "fail operation".

Figure 4:
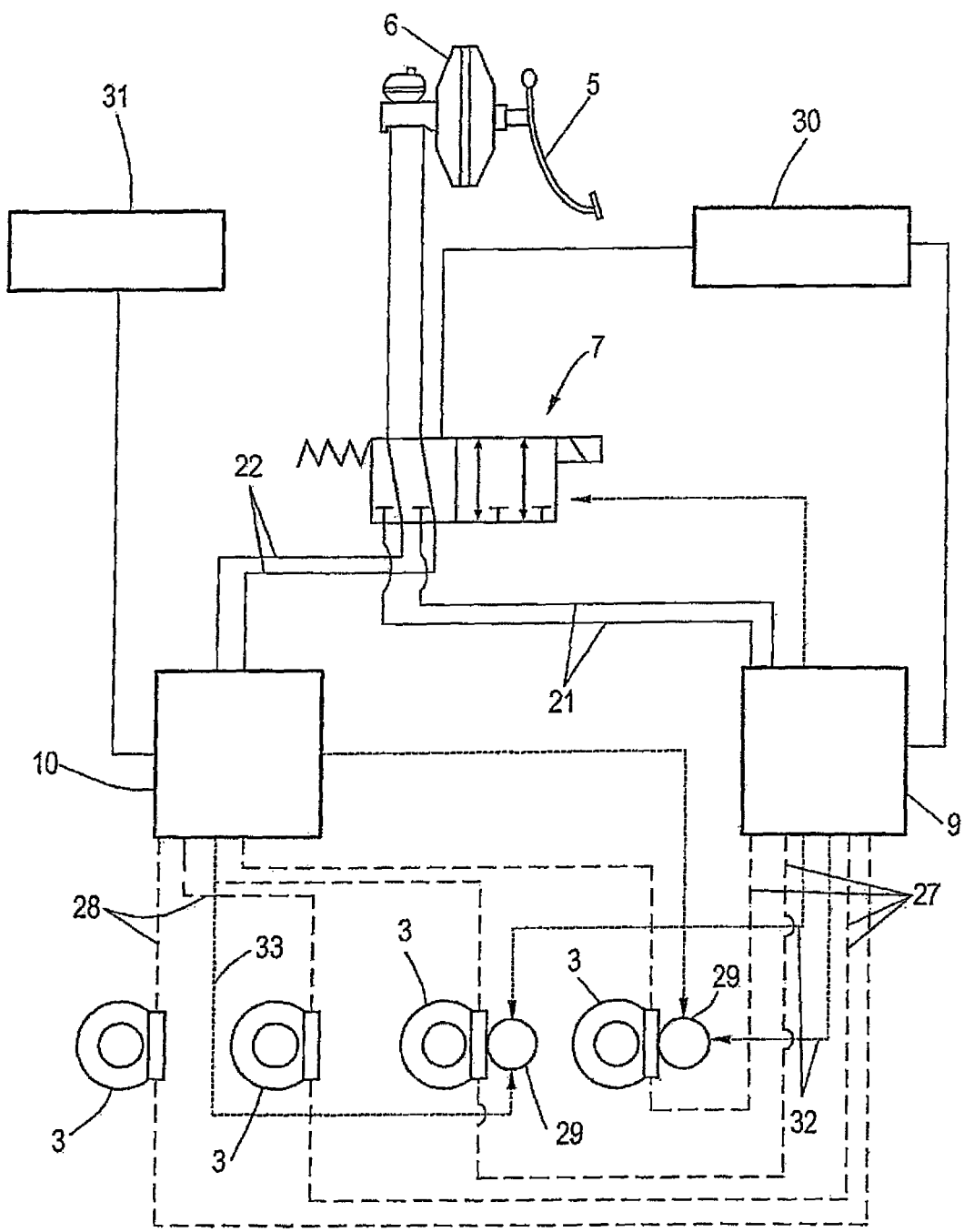
FIG. 4 shows a schematic diagram of the braking system design with integration of an electronic parking brake function of a first configuration.

FIG. 4 shows a schematic representation in which an additional electronic parking brake is realized on two brakes 3. For this an electric motor 29 is assigned to these two brakes. As shown, a general control connection exists between the first ESC block 9 and these two electric motors 29 as well as between the second ESC block 10 and these two electric motors. This means that depending on the switching state of the valve unit 7 either the ESC block 9 or the ESC block 10 performs the control of the electric motors, of course via the respectively integrated control device 25 or 26. Depending on which braking circuit or ESC block 9, 10 is activated, an electronic control of the parking brake is possible in any case. In the shown example the emergency situation is shown in which the ESC block 10 is activated.

FIG. 4 exemplary shows two separate electric systems or vehicle electric systems 30, 31. The vehicle electric system 30 supplies on one hand—of course beside a multitude of other components—the ESC block 9 as well as the valve unit 7 with current. When the current supply fails in this vehicle electric system or is instable, the actuating element 12 of the valve unit 7, as described above, is no longer supplied with current, the valve slide 11 is automatically displaced in the emergency position shown in FIG. 3 or 4, in which switching to the second braking circuit has occurred.

The second electric circuit or the second vehicle electric system 31 supplies—beside a multitude of other components—only the second ESC block 10 but not the valve unit 7. The latter does no longer require current supply, because the valve unit 7 has to ensure that in any case the second braking circuit is connected.

Figure 5:
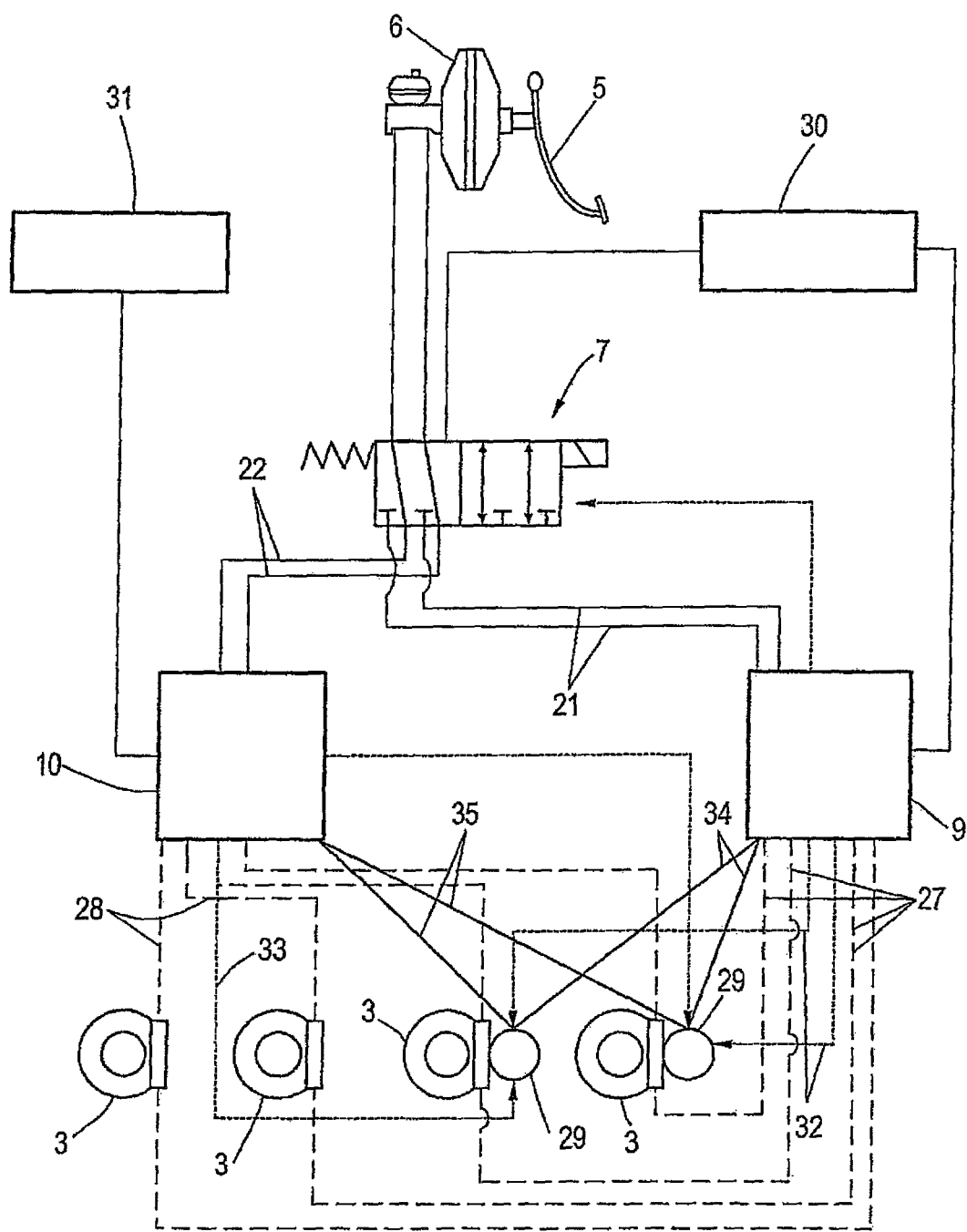
FIG. 5 shows a schematic diagram of the braking system design with integration of an electronic parking break function of a second configuration.

FIG. 5 shows a representation according to FIG. 4 in which however in addition to the control of the electric motors 29 only either via the ESC block 9 or the ESC block 10, the two electric motors 29 are also supplied with current either via the ESC block 9 or the ESC block 10. While in this case the control possibility via the respective control lines 32, in case of the ESC block 9 or 33 in case of the ESC block 10 is shown, the current supply via the corresponding supply lines 34 in the case of the ESC block 9 or 35 in the case of the ESC block 10 are shown. In the present case—which also shows operation under emergency conditions—the current supply of the electric motors 29 would occur via the ESC block 10. This means that in this case not only the control but also the current supply of the electric motors is realized entirely via the second braking circuit.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising:
multiple wheels, each having at least one assigned hydraulically actuatable brake;
a first and a second hydraulic braking circuit for actuating the brakes, each of said first and second hydraulic braking circuits comprising multiple valves for modulating a braking pressure in the first and second hydraulic braking circuits, the multiple valves of each of the first and second hydraulic braking circuits together forming a valve assembly;
a first control device operably connected with and separately controlling the multiple valves of each of the two hydraulic braking circuits;
a third and a fourth hydraulic braking circuit, each of said third and fourth braking circuits comprising multiple valves for modulating a braking pressure in the third and fourth hydraulic braking circuits, the multiple valves of each of the third and fourth hydraulic braking circuits together forming a further valve assembly;
a second control device operably connected with and separately controlling the multiple valves of each of the third and fourth hydraulic braking circuits;
a brake booster, operably connectable to the first and second hydraulic braking circuits and the third and fourth hydraulic braking circuits; and
a valve unit arranged downstream of the brake booster, and in response to a malfunction of one or both of the first and/or the second braking circuits being switchable from a first position in which it connects the valve assembly of the first and second hydraulic braking circuits to the brake booster, into a second position in which it connects the further valve assembly of the third and fourth separate hydraulic braking circuits to the brake booster, wherein the valve unit is an electrically controllable multi-way valve.

2. The motor vehicle of claim 1, wherein the multi-way valve is a 6/2 way valve.

3. The motor vehicle of claim 1, wherein the valve unit is integrated in a first electric circuit which supplies the valve assembly of the first and second braking circuits and the first control device with current, so that an electromagnetic actuating element arranged in the valve unit and supplied with current via the first electric circuit, moves a valve slide into the first position against a restoring force of a spring element, thereby opening the valve unit to the valve assembly of the first and second braking circuits, and wherein in the case of a power failure in the first electric circuit the spring element automatically moves the valve slide into the second position, thereby opening the valve unit to the valve assembly of the third and fourth braking circuits.

4. The motor vehicle of claim 3, wherein the electromagnetic actuating element or a further electromagnetic actuating element is controllable via the first control device for moving the valve slide or a further valve slide from the first position into the second position.

5. The motor vehicle of claim 1, wherein at least two of the brakes are provided with electric motors which actuate the brakes and which are controllable via the control device when the valve unit is switched to the first position or by the further control device when the valve unit is switched to the second position.

6. The motor vehicle of claim 5, wherein the electric motors are supplied with current respectively via the valve assembly and the further valve assembly or the first control device and the second control device.

* * * * *